United States Patent
Leiceaga

(10) Patent No.: US 9,581,710 B2
(45) Date of Patent: Feb. 28, 2017

(54) THREE-DIMENSIONAL ROCK PROPERTIES USING CROSS WELL SEISMIC

(71) Applicant: WESTERNGECO L.L.C., Houston, TX (US)

(72) Inventor: Gorka Garcia Leiceaga, Houston, TX (US)

(73) Assignee: WESTERNGECO L.L.C., Houston, TX (US)

( * ) Notice: Subject to any disclaimer, the term of this patent is extended or adjusted under 35 U.S.C. 154(b) by 299 days.

(21) Appl. No.: 14/522,895

(22) Filed: Oct. 24, 2014

(65) Prior Publication Data

US 2016/0116619 A1 Apr. 28, 2016

(51) Int. Cl.
*G01V 1/00* (2006.01)
*G01V 1/34* (2006.01)
*G01V 1/30* (2006.01)

(52) U.S. Cl.
CPC ........... *G01V 1/345* (2013.01); *G01V 1/003* (2013.01); *G01V 1/306* (2013.01)

(58) Field of Classification Search
CPC ........ G01V 1/306; G01V 1/345; G01V 1/003; G01V 99/005
See application file for complete search history.

(56) References Cited

U.S. PATENT DOCUMENTS

| | | |
|---|---|---|
| 2002/0122352 A1 | 9/2002 | Khan |
| 2008/0224887 A1 | 9/2008 | Varsamis et al. |
| 2012/0221306 A1* | 8/2012 | Hurley .............. G01V 99/005 703/6 |
| 2013/0054201 A1 | 2/2013 | Posamentier et al. |
| 2014/0257706 A1 | 9/2014 | Biterge et al. |
| 2014/0257707 A1 | 9/2014 | Chavarria |

OTHER PUBLICATIONS

Contreras, et al., "Joint stochastic inversion of 3D pre-stack seismic data and well logs for high-resolution reservoir characterization and petrophysical modeling: application to deepwater hydrocarbon reservoirs in the central Gulf of Mexico", SPWLA Society of Petrophysicists and Well Log Analysts 46th Annual Logging Symposium, 2005, 4 pages.

Leiceaga et al., "Crosswell seismic applications for improved reservoir understanding", The Leading Edge, Apr. 2015, vol. 34, Issue 4, pp. 422-424, 426-428.

International Search Report and Written Opinion issued in related International Application No. PCT/US2015/055063 mailed Jan. 11, 2016 (9 pages).

* cited by examiner

*Primary Examiner* — Luke Ratcliffe
*Assistant Examiner* — Hovhannes Baghdasaryan

(57) ABSTRACT

Various implementations directed to determining three-dimensional (3D) rock properties using cross well seismic are provided. In one implementation, a method may include receiving 3D seismic data acquired in a seismic survey of a region of interest. The method may also include receiving cross well seismic data acquired in a cross well seismic survey of the region of interest. The method may further include determining a first set of rock properties of the region of interest based on the cross well seismic data. The method may additionally include determining one or more variograms based on the first set of rock properties. The method may also include determining one or more 3D rock properties of the region of interest based on the one or more variograms and the 3D seismic data.

20 Claims, 9 Drawing Sheets

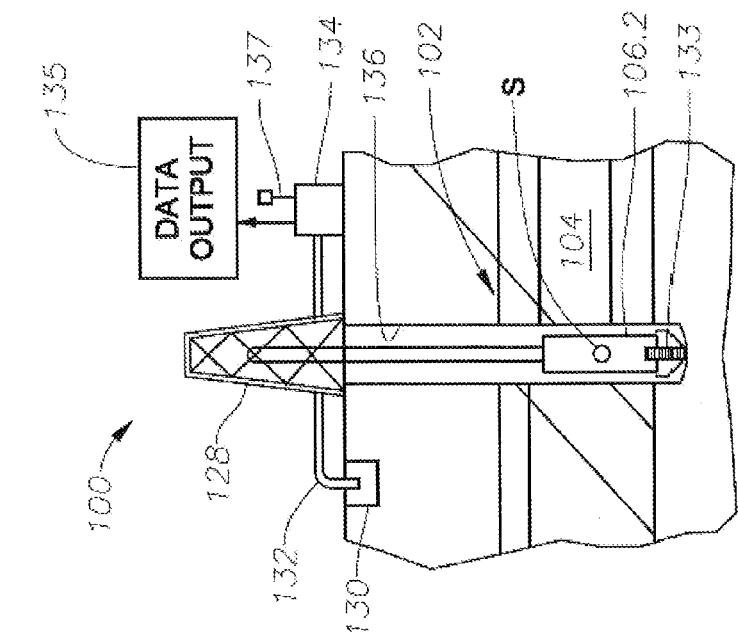
FIG. 1.2
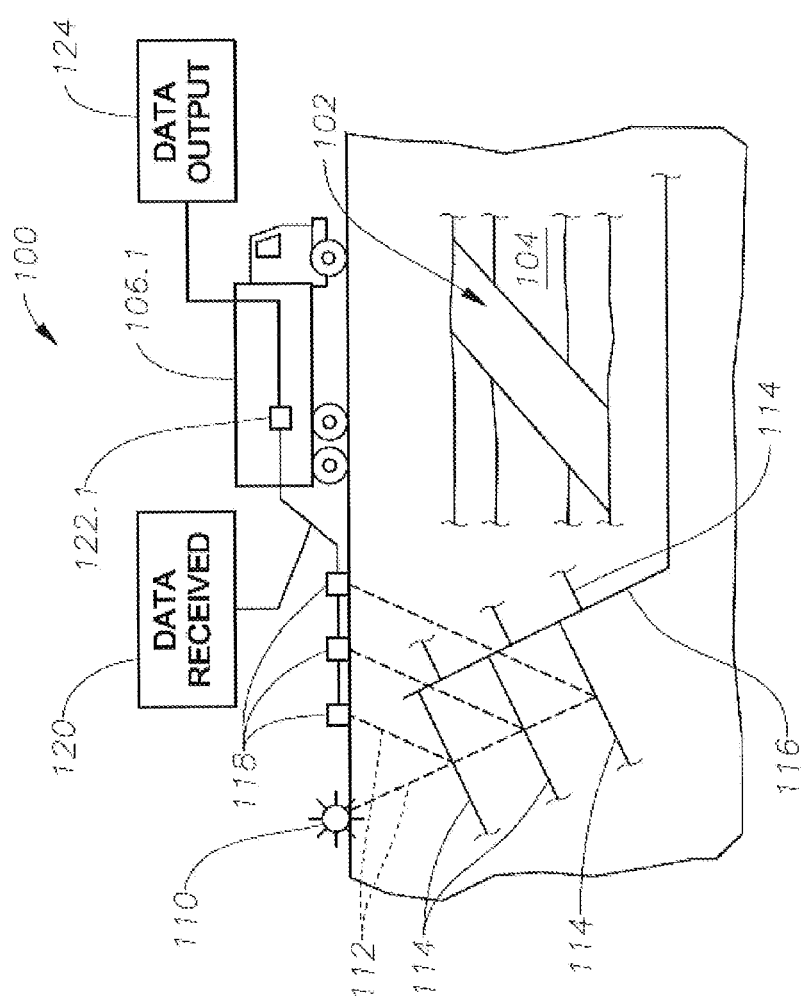
FIG. 1.1

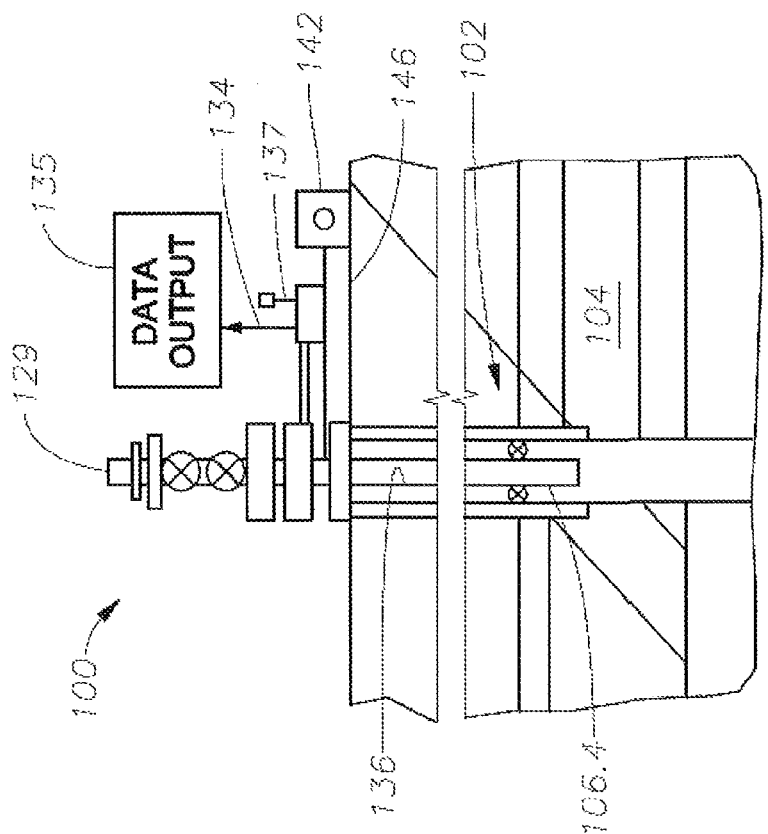
FIG. 1.3
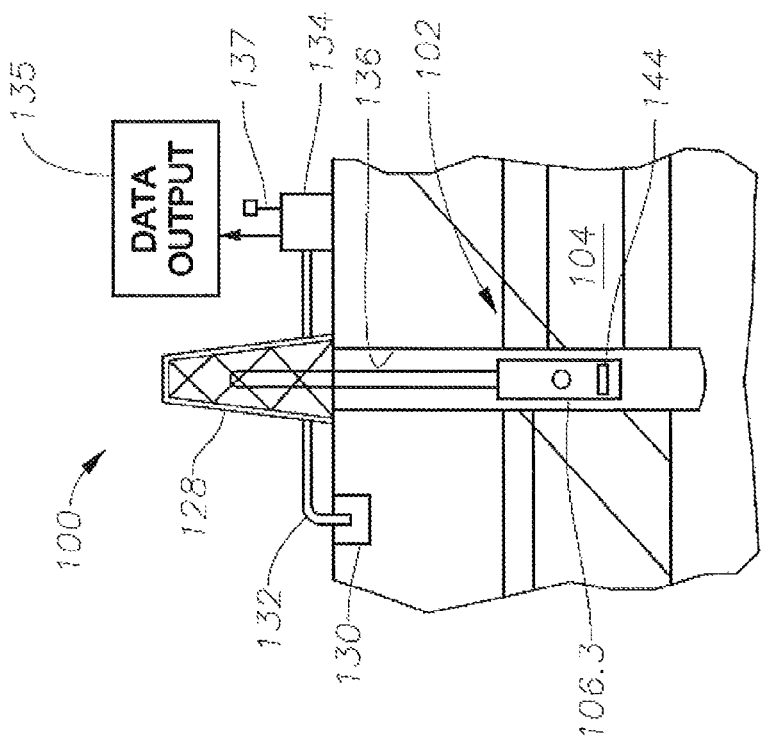
FIG. 1.4

THREE-DIMENSIONAL ROCK PROPERTIES USING CROSS WELL SEISMIC

BACKGROUND

In a seismic survey, a plurality of seismic sources, such as explosives, vibrators, air guns, and/or the like, may be sequentially activated near the surface of the earth or in a wellbore to generate energy (i.e., seismic waves) which may propagate into and through the earth. The seismic waves may be reflected back by geological formations within the earth, and the resultant seismic wavefield may be sampled by a plurality of seismic receivers, such as geophones, hydrophones and the like. Each receiver may be configured to acquire seismic data at the receiver's location, normally in the form of a seismogram representing the value of some characteristic of the seismic wavefield against time. The acquired seismograms or seismic data may be transmitted wirelessly or over electrical or optical cables to a recorder system. The recorder system may then store, analyze, and/or transmit the seismic data. This data may be used to generate an image of subsurface formations in the earth and may also be used to detect the possible presence of hydrocarbons, changes in the subsurface formations and the like.

In one scenario, three-dimensional (3D) surface seismic data may be generated and recorded by the receivers, where the 3D surface seismic data may represent a set of sound vibrations propagating in three dimensions within the earth (i.e., along x, y, and z axes). Such 3D surface seismic may be used to locate prospective reef development. Reef tops may mark an interface from shale to limestone that may creates a high-reflectivity event in the seismic wavefield. However, in some scenarios, 3D surface seismic images may have less resolution than images derived from other seismic data, such as by borehole seismic data.

SUMMARY

Various implementations directed to determining three-dimensional (3D) rock properties using cross well seismic are provided. In one implementation, a method may include receiving 3D seismic data acquired in a seismic survey of a region of interest. The method may also include receiving cross well seismic data acquired in a cross well seismic survey of the region of interest. The method may further include determining a first set of rock properties of the region of interest based on the cross well seismic data. The method may additionally include determining one or more variograms based on the first set of rock properties. The method may also include determining one or more 3D rock properties of the region of interest based on the one or more variograms and the 3D seismic data.

In another implementation, a non-transitory computer-readable medium having stored thereon a plurality of computer-executable instructions which, when executed by a computer, cause the computer to receive 3D seismic data acquired in a seismic survey of a region of interest. The computer-executable instructions may also cause the computer to receive cross well seismic data acquired in a cross well seismic survey of the region of interest. The computer-executable instructions may further cause the computer to determine a first set of rock properties of the region of interest based on the cross well seismic data. The computer-executable instructions may additionally cause the computer to determine one or more variograms based on the first set of rock properties. The computer-executable instructions may also cause the computer to determine one or more 3D rock properties of the region of interest based on the one or more variograms and the 3D seismic data.

In yet another implementation, a computer system may include a processor and a memory, the memory having a plurality of program instructions which, when executed by the processor, cause the processor to receive 3D seismic data acquired in a seismic survey of a region of interest. The plurality of program instructions may also cause the processor to receive cross well seismic data acquired in a cross well seismic survey of the region of interest. The plurality of program instructions may further cause the processor to determine a first set of rock properties of the region of interest based on the cross well seismic data. The plurality of program instructions may additionally cause the processor to determine one or more variograms based on the first set of rock properties. The plurality of program instructions may also cause the processor to determine one or more 3D rock properties of the region of interest based on the one or more variograms and the 3D seismic data.

The above referenced summary section is provided to introduce a selection of concepts in a simplified form that are further described below in the detailed description section. The summary is not intended to be used to limit the scope of the claimed subject matter. Furthermore, the claimed subject matter is not limited to implementations that solve any disadvantages noted in any part of this disclosure. Indeed, the systems, methods, processing procedures, techniques, and workflows disclosed herein may complement or replace conventional methods for identifying, isolating, and/or processing various aspects of seismic signals or other data that is collected from a subsurface region or other multi-dimensional space, including time-lapse seismic data collected in a plurality of surveys.

BRIEF DESCRIPTION OF THE DRAWINGS

Implementations of various techniques will hereafter be described with reference to the accompanying drawings. It should be understood, however, that the accompanying drawings illustrate the various implementations described herein and are not meant to limit the scope of various techniques described herein.

FIGS. 1.1-1.4 illustrate simplified, schematic views of an oilfield having subterranean formation containing reservoir therein in accordance with implementations of various technologies and techniques described herein.

DETAILED DESCRIPTION

Figure 2:
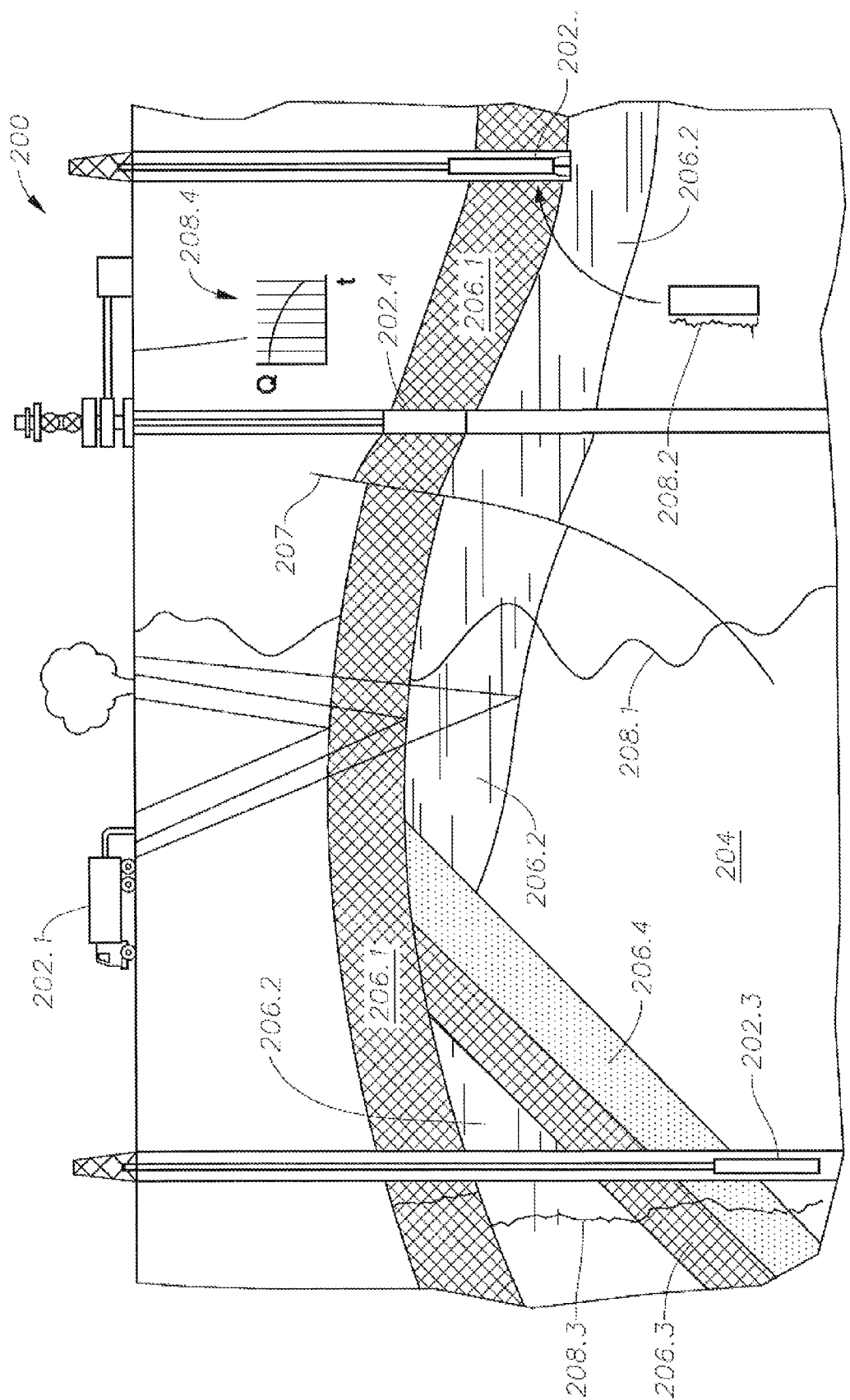
FIG. 2 illustrates a schematic view, partially in cross section of an oilfield having data acquisition tools positioned at various locations along the oilfield for collecting data of a subterranean formation in accordance with implementations of various technologies and techniques described herein.

The discussion below is directed to certain specific implementations. It is to be understood that the discussion below is for the purpose of enabling a person with ordinary skill in the art to make and use any subject matter defined now or later by the patent "claims" found in any issued patent herein.

It is specifically intended that the claims not be limited to the implementations and illustrations contained herein, but include modified forms of those implementations including portions of the implementations and combinations of elements of different implementations as come within the scope of the following claims.

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to obscure aspects of the embodiments.

It will also be understood that, although the terms first, second, etc. may be used herein to describe various elements, these elements should not be limited by these terms. These terms are used to distinguish one element from another. For example, a first object could be termed a second object, and, similarly, a second object could be termed a first object, without departing from the scope of the claims. The first object and the second object are both objects, respectively, but they are not to be considered the same object.

The terminology used in the description of the present disclosure herein is for the purpose of describing particular implementations and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses one or more possible combinations of one or more of the associated listed items. It will be further understood that the terms "includes" and/or "including," when used in this specification, specify the presence of stated features, integers, operations, elements, and/or components, but do not preclude the presence or addition of one or more other features, integers, operations, elements, components and/or groups thereof.

As used herein, the terms "up" and "down"; "upper" and "lower"; "upwardly" and "downwardly"; "below" and "above"; and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate.

It should also be noted that in the development of any such actual implementation, numerous decisions specific to circumstance may be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The terminology and phraseology used herein is solely used for descriptive purposes and should not be construed as limiting in scope. Language such as "having," "containing," or "involving," and variations thereof, is intended to be broad and encompass the subject matter listed thereafter, equivalents, and additional subject matter not recited.

Furthermore, the description and examples are presented solely for the purpose of illustrating the different embodiments, and should not be construed as a limitation to the scope and applicability. While any composition or structure may be described herein as having certain materials, it should be understood that the composition could optionally include two or more different materials. In addition, the composition or structure may also include some components other than the ones already cited. It should also be understood that throughout this specification, when a range is described as being useful, or suitable, or the like, it is intended that any value within the range, including the end points, is to be considered as having been stated. Furthermore, respective numerical values should be read once as modified by the term "about" (unless already expressly so modified) and then read again as not to be so modified unless otherwise stated in context. For example, "a range of from 1 to 10" is to be read as indicating a respective possible number along the continuum between about 1 and about 10. In other words, when a certain range is expressed, even if a few specific data points are explicitly identified or referred to within the range, or even when no data points are referred to within the range, it is to be understood that the inventors appreciate and understand that any data points within the range are to be considered to have been specified, and that the inventors have possession of the entire range and points within the range.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

One or more implementations of various techniques for determining three-dimensional (3D) rock properties using cross well seismic will now be described in more detail with reference to FIGS. 1-8 in the following paragraphs.

Production Environment

FIGS. 1.1-1.4 illustrate simplified, schematic views of a production field 100 having subterranean formation 102 containing reservoir 104 therein in accordance with implementations of various technologies and techniques described herein. The production field 100 may be an oilfield, a gas field, and/or the like. FIG. 1.1 illustrates a survey operation being performed by a survey tool, such as seismic truck 106.1, to measure properties of the subterranean formation 102. The survey operation may be a seismic survey operation for producing sound vibrations. In FIG. 1.1, one such sound vibration, e.g., sound vibration 112 generated by source 110, may reflect off horizons 114 in earth formation 116. A set of sound vibrations may be received by sensors, such as geophone-receivers 118, situated on the earth's surface. The data received 120 may be provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1.2 illustrates a drilling operation being performed by drilling tools 106.2 suspended by rig 128 and advanced into subterranean formations 102 to form wellbore 136. Mud pit 130 may be used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling mud. The drilling tools may be advanced into subterranean formations 102 to reach reservoir 104. Each well may target one or more reservoirs. The drilling tools may be adapted for measuring downhole properties using logging while drilling tools. The logging while drilling tools may also be adapted for taking core sample 133 as shown.

Computer facilities may be positioned at various locations about the production field 100 (e.g., the surface unit 134) and/or at remote locations. Surface unit 134 may be used to communicate with the drilling tools and/or offsite operations, as well as with other surface or downhole sensors. Surface unit 134 may be capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about production field 100 to collect data relating to various production field operations as described previously. As shown, sensor (S) may be positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly may include capabilities for measuring, processing, and storing information, as well as communicating with surface unit 134. The bottom hole assembly may further include drill collars for performing various other measurement functions.

The bottom hole assembly may include a communication subassembly that communicates with surface unit 134. The communication subassembly may be adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It may be appreciated by one of skill in the art that a variety of telemetry systems may be employed, such as wired drill pipe, electromagnetic or other known telemetry systems.

The wellbore may be drilled according to a drilling plan that is established prior to drilling. The drilling plan may set forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the production field 100 or other locations. Surface unit 134 may also be provided with or functionally connected to one or more controllers (not shown) for actuating mechanisms at production field 100. Surface unit 134 may then send command signals to production field 100 in response to data received. Surface unit 134 may receive commands via transceiver 137 or may itself execute commands to the controller. A processor may be provided to analyze the data (locally or remotely), make the decisions and/or actuate the controller. In this manner, production field 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1.3 illustrates a wireline operation being performed by wireline tool 106.3 suspended by rig 128 and into wellbore 136 of FIG. 1.2. Wireline tool 106.3 may be adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1.1. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about production field 100 to collect data relating to various field operations as described previously. As shown, sensor S may be positioned in wireline tool 106.3 to measure downhole parameters which relate to, for example porosity, permeability, fluid composition and/or other parameters of the field operation.

FIG. 1.4 illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about production field 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1.2-1.4 illustrate tools used to measure properties of a production field, such as an oilfield or gas field, it may be appreciated that the tools may be used in connection with other operations, such as mines, aquifers, storage, or other subterranean facilities. Also, while certain data acquisition tools are depicted, it may be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1.1-1.4 may be an example of a field usable with oilfield or gas field application frameworks. At least part of the production field 100 may be on land, water, and/or sea. Also, while a single field measured at a single location may be depicted, oilfield or gas field applications may be utilized with any combination of one or more oilfields and/or gas field, one or more processing facilities and one or more wellsites.

FIG. 2 illustrates a schematic view, partially in cross section of production field 200 having data acquisition tools 202.1, 202.2, 202.3 and 202.4 positioned at various locations along production field 200 for collecting data of subterranean formation 204 in accordance with implementations of various technologies and techniques described herein. The production field 200 may be an oilfield, a gas field, and/or the like. Data acquisition tools 202.1-202.4 may be the same as data acquisition tools 106.1-106.4 of FIGS. 1.1-1.4, respectively, or others not depicted. As shown, data acquisition tools 202.1-202.4 may generate data plots or measurements 208.1-208.4, respectively. These data plots may be depicted along production field 200 to demonstrate the data generated by the various operations.

Data plots 208.1-208.3 may be examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 may be a seismic two-way response over a period of time. Static plot 208.2 may be core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 may be a logging trace that may provide a resistivity or other measurement of the formation at various depths.

A production decline curve or graph 208.4 may be a dynamic data plot of the fluid flow rate over time. The production decline curve may provide the production rate as a function of time. As the fluid flows through the wellbore, measurements may be taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 may have a plurality of geological formations 206.1-206.4. As shown, this structure may have several formations or layers, including a shale layer 206.1, a carbonate layer 206.2, a shale layer 206.3 and a sand layer 206.4. A fault 207 may extend through the shale layer 206.1 and the carbonate layer 206.2. The static data acquisition tools may be adapted to take measurements and detect characteristics of the formations.

While a specific subterranean formation with specific geological structures is depicted, it may be appreciated that production field 200 may contain a variety of geological structures and/or formations, sometimes having extreme complexity. In some locations, such as below the water line, fluid may occupy pore spaces of the formations. Each of the measurement devices may be used to measure properties of the formations and/or its geological features. While each acquisition tool may be shown as being in specific locations in production field 200, it may be appreciated that one or more types of measurement may be taken at one or more locations across one or more fields or other locations for comparison and/or analysis.

The data collected from various sources, such as the data acquisition tools of FIG. 2, may then be processed and/or evaluated. The seismic data displayed in static data plot 208.1 from data acquisition tool 202.1 may be used by a geophysicist to determine characteristics of the subterranean formations and features. The core data shown in static plot 208.2 and/or log data from well log 208.3 may be used by a geologist to determine various characteristics of the subterranean formation. The production data from graph 208.4 may be used by the reservoir engineer to determine fluid flow reservoir characteristics. The data analyzed by the geologist, geophysicist and the reservoir engineer may be analyzed using modeling techniques.

Figure 3:
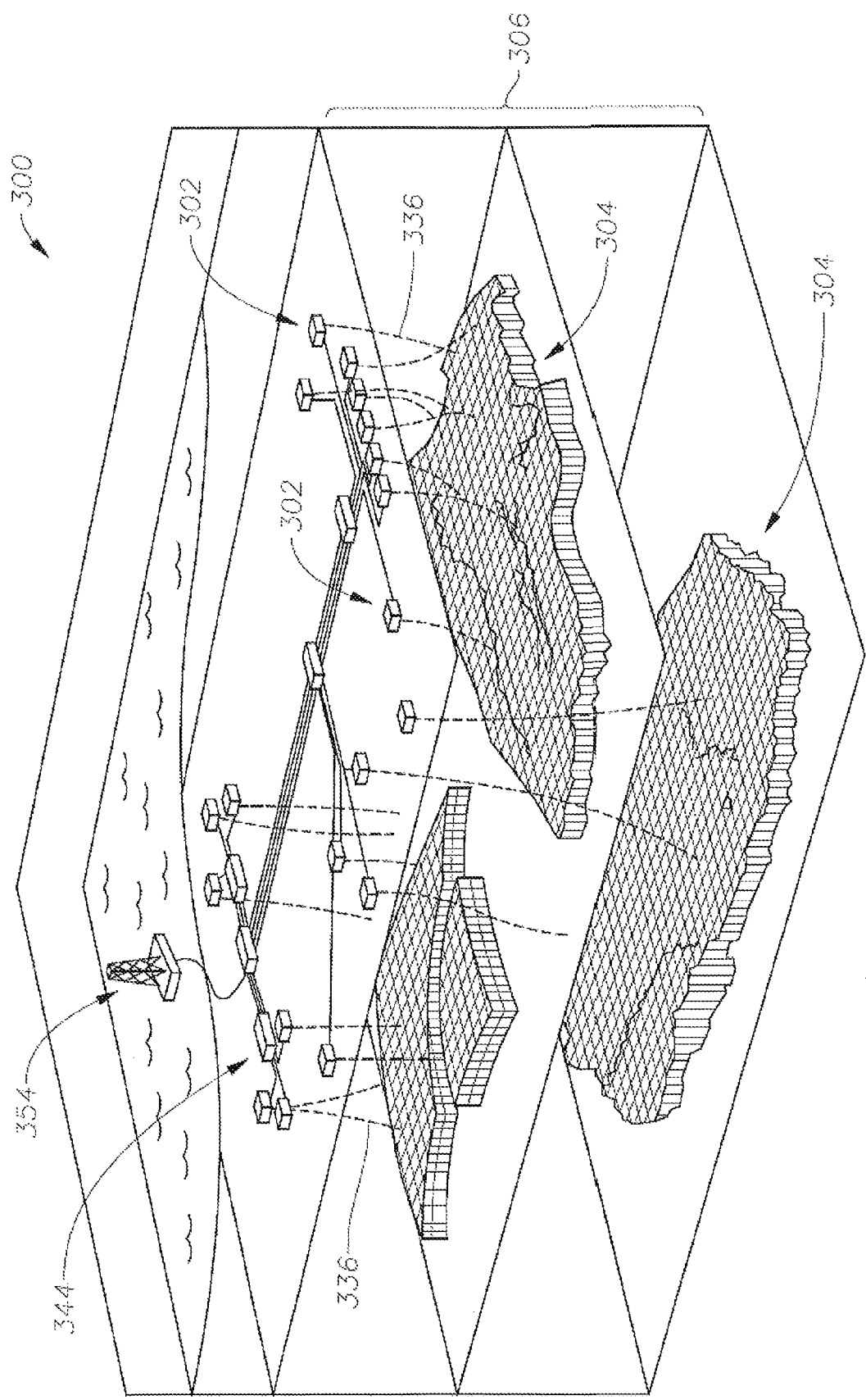
FIG. 3 illustrates an oilfield for performing production operations in accordance with implementations of various technologies and techniques described herein.

FIG. 3 illustrates a production field 300 for performing production operations in accordance with implementations of various technologies and techniques described herein. The production field 300 may be an oilfield, a gas field, and/or the like. As shown, the production field 300 may have a plurality of wellsites 302 operatively connected to central processing facility 354. The production field configuration of FIG. 3 may not be intended to limit the scope of the production field application system. At least part of the production field may be on land and/or sea. Also, while a single production field with a single processing facility and a plurality of wellsites is depicted, any combination of one or more production fields, one or more processing facilities and one or more wellsites may be present.

Each wellsite 302 may have equipment that forms wellbore 336 into the earth. The wellbores may extend through subterranean formations 306 including reservoirs 304. These reservoirs 304 may contain fluids, such as hydrocarbons. The wellsites may draw fluid from the reservoirs and pass them to the processing facilities via surface networks 344. The surface networks 344 may have tubing and control mechanisms for controlling the flow of fluids from the wellsite to processing facility 354.

Figure 4:
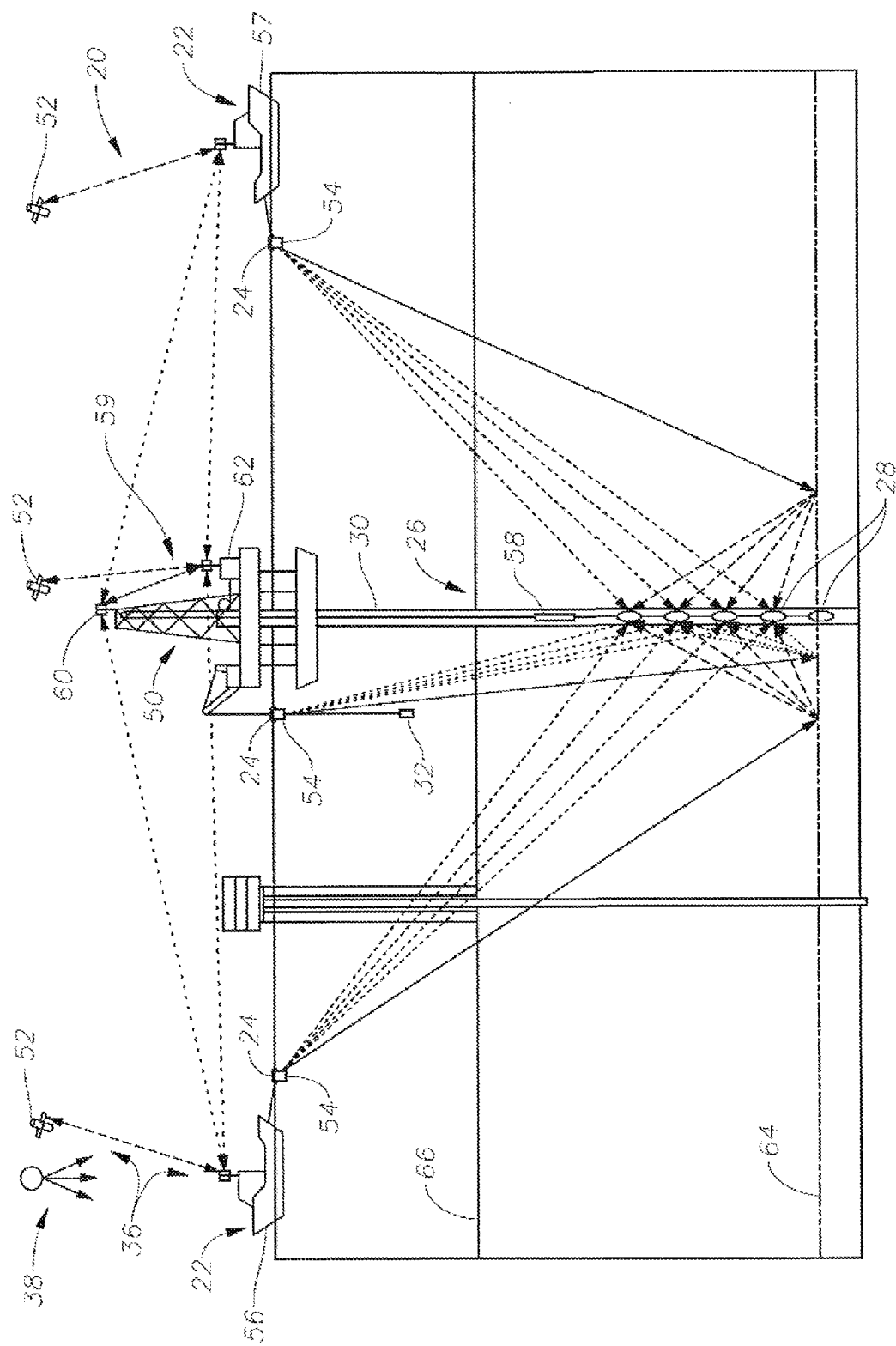
FIG. 4 illustrates a seismic system in accordance with implementations of various technologies and techniques described herein.

FIG. 4 illustrates a seismic system 20 in accordance with implementations of various technologies and techniques described herein. The seismic system 20 may include a plurality of tow vessels 22 that are employed to enable seismic profiling, e.g. three-dimensional vertical seismic profiling or rig/offset vertical seismic profiling. In FIG. 4, a marine system may include a rig 50, a plurality of vessels 22, and one or more acoustic receivers 28. Although a marine system is illustrated, other implementations of the disclosure may not be limited to this example. A person of ordinary skill in the art may recognize that land or offshore systems may be used.

Although two vessels 22 are illustrated in FIG. 4, a single vessel 22 with multiple source arrays 24 or multiple vessels 22 with single or multiple sources 24 may be used. In some implementations, at least one source and/or source array 24 may be located on the rig 50, as shown by the rig source in FIG. 4. As the vessels 22 travel on predetermined or systematic paths, their locations may be recorded through the use of navigation system 36. In some implementations, the navigation system 36 may utilize a global positioning system (GPS) 38 to record the position, speed, direction, and other parameters of the tow vessels 22.

As shown, the global positioning system 38 may utilize or work in cooperation with satellites 52 which operate on a suitable communication protocol, e.g. VSAT communications. The VSAT communications may be used, among other things, to supplement VHF and UHF communications. The GPS information can be independent of the VSAT communications and may be input to a processing system or other suitable processors to predict the future movement and position of the vessels 22 based on real-time information. In addition to predicting future movements, the processing system also can be utilized to provide directions and coordinates as well as to determine initial shot times, as described above. A control system effectively utilizes the processing system in cooperation with a source controller and a synchronization unit to synchronize the sources 24 with the downhole data acquisition system 26.

As shown, the one or more vessels 22 may respectively tow one or more acoustic sources/source arrays 24. The source arrays 24 include one or more seismic signal generators 54, e.g. air guns, configured to create a seismic and/or sonic disturbance. In the implementation illustrated, the tow vessels 22 comprise a master source vessel 56 (Vessel A) and a slave source vessel 57 (Vessel B). However, other numbers and arrangements of tow vessels 22 may be employed to accommodate the parameters of a given seismic profiling application. For example, one source 24 may be mounted at rig 50 (see FIG. 4) or at another suitable location, and both vessels 22 may serve as slave vessels with respect to the rig source 24 or with respect to a source at another location.

However, a variety of source arrangements and implementations may be used. When utilizing dithered timing between the sources, for example, the master and slave locations of the sources can be adjusted according to the parameters of the specific seismic profiling application. In some implementations, one of the source vessels 22 (e.g. source vessel A in FIG. 4) may serve as the master source vessel while the other source vessel 22 serves as the slave source vessel with dithered firing. However, an alternate source vessel 22 (e.g. source vessel B in FIG. 4) may serve as the master source vessel while the other source vessel 22 serves as the slave source vessel with dithered firing.

Similarly, the rig source 22 may serve as the master source while one of the source vessels 22 (e.g. vessel A) serves as the slave source vessel with dithered firing. The rig source 22 also may serve as the master source while the other source vessel 22 (e.g. vessel B) serves as the slave source vessel with dithered firing. In some implementations, the rig source 22 may serve as the master source while both of the source vessels 22 serve as slave source vessels each with dithered firings. These and other implementations may be used in achieving the desired synchronization of sources 22 with the downhole acquisition system 26.

The acoustic receivers 28 of data acquisition system 26 may be deployed in borehole 30 via a variety of delivery systems, such as wireline delivery systems, slickline delivery systems, and other suitable delivery systems. Although a single acoustic receiver 28 could be used in the borehole 30, a plurality of receivers 28, as shown, may be located in a variety of positions and orientations. The acoustic receivers 28 may be configured for sonic and/or seismic reception. Additionally, the acoustic receivers 28 may be communicatively coupled with processing equipment 58 located downhole. In one implementation, processing equipment 58 may comprise a telemetry system for transmitting data from acoustic receivers 28 to additional processing equipment 59 located at the surface, e.g. on the rig 50 and/or vessels 22.

Depending on the data communication system, surface processing equipment 59 may include a radio repeater 60, an acquisition and logging unit 62, and a variety of other and/or additional signal transfer components and signal processing components. The radio repeater 60 along with other components of processing equipment 59 may be used to communicate signals, e.g. UHF and/or VHF signals, between vessels 22 and rig 50 and to enable further communication with downhole data acquisition system 26.

It should be noted the UHF and VHF signals can be used to supplement each other. The UHF band may support a higher data rate throughput, but can be susceptible to obstructions and has less range. The VHF band may be less susceptible to obstructions and may have increased radio range but its data rate throughput is lower. In FIG. 4, the VHF communications may "punch through" an obstruction in the form of a production platform.

In some implementations, the acoustic receivers 28 may be coupled to surface processing equipment 59 via a hardwired connection. In other implementations, wireless or optical connections may be employed. In still other implementations, combinations of coupling techniques may be employed to relay information received downhole via the acoustic receivers 28 to an operator and/or the control system described above, located at least in part at the surface.

In addition to providing raw or processed data uphole to the surface, the coupling system, e.g. downhole processing equipment 58 and surface processing equipment 59, may be designed to transmit data or instructions downhole to the acoustic receivers 28. For example, the surface processing equipment 59 may comprise a synchronization unit, which may coordinate the firing of sources 24, e.g. dithered (delayed) source arrays, with the acoustic receivers 28 located in borehole 30. In one implementation, the synchronization unit may use a coordinated universal time to ensure accurate timing. In some implementations, the coordinated universal time system may be employed in cooperation with global positioning system 38 to obtain UTC data from the GPS receivers of GPS system 38.

FIG. 4 illustrates one example of a system for performing seismic profiling that can employ simultaneous or near-simultaneous acquisition of seismic data. In one implementation, the seismic profiling may comprise three-dimensional vertical seismic profiling, but other applications may utilize rig and/or offset vertical seismic profiling or seismic profiling employing walkaway lines. An offset source can be provided by a source 24 located on rig 50, on a vessel 22, and/or on another vessel or structure. In one implementation, the vessels 22 may be substantially stationary.

In one implementation, the overall seismic system 20 may employ various arrangements of sources 24 on vessels 22 and/or rig 50 with each location having at least one source and/or source array 24 to generate acoustic source signals. The acoustic receivers 28 of downhole acquisition system 26 may be configured to receive the source signals, at least some of which are reflected off a reflection boundary 64 located beneath a sea bottom 66. The acoustic receivers 28 may generate data streams that are relayed uphole to a suitable processing system, e.g. the processing system described above, via downhole telemetry/processing equipment 58.

While the acoustic receivers 28 generate data streams, the navigation system 36 may determine a real-time speed, position, and direction of each vessel 22 and may estimate initial shot times accomplished via signal generators 54 of the appropriate source arrays 24. The source controller may be part of surface processing equipment 59 (located on rig 50, on vessels 22, or at other suitable locations) and may be designed to control firing of the acoustic source signals so that the timing of an additional shot time (e.g. a shot time via slave vessel 57) is based on the initial shot time (e.g. a shot time via master vessel 56) plus a dither value.

The synchronization unit of, for example, surface processing equipment 59, may coordinate the firing of dithered acoustic signals with recording of acoustic signals by the downhole acquisition system 26. The processor system may be configured to separate a data stream of the initial shot and a data stream of the additional shot via a coherency filter. As discussed above, however, other implementations may employ pure simultaneous acquisition and/or may not use separation of the data streams. In such implementations, the dither is effectively zero.

After an initial shot time at T=0 (T0) is determined, subsequent firings of acoustic source arrays 24 may be offset by a dither. The dithers can be positive or negative and sometimes are created as pre-defined random delays. Use of dithers facilitates the separation of simultaneous or near-simultaneous data sets to simplify the data processing. The ability to have the acoustic source arrays 24 fire in simultaneous or near-simultaneous patterns may reduce the overall amount of time for three-dimensional vertical seismic profiling source acquisition. This, in turn, may significantly reduce rig time. As a result, the overall cost of the seismic operation may be reduced, rendering the data intensive process much more accessible.

If the acoustic source arrays used in the seismic data acquisition are widely separated, the difference in move-outs across the acoustic receiver array of the wave fields generated by the acoustic sources 24 can be used to obtain a clean data image via processing the data without further special considerations. However, even when the acoustic sources 24 are substantially co-located in time, data acquired by any of the methods involving dithering of the firing times of the individual sources 24 described herein can be processed to a formation image leaving hardly any artifacts in the final image. This is accomplished by taking advantage of the incoherence of the data generated by one acoustic source 24 when seen in the reference time of the other acoustic source 24.

Figure 5:
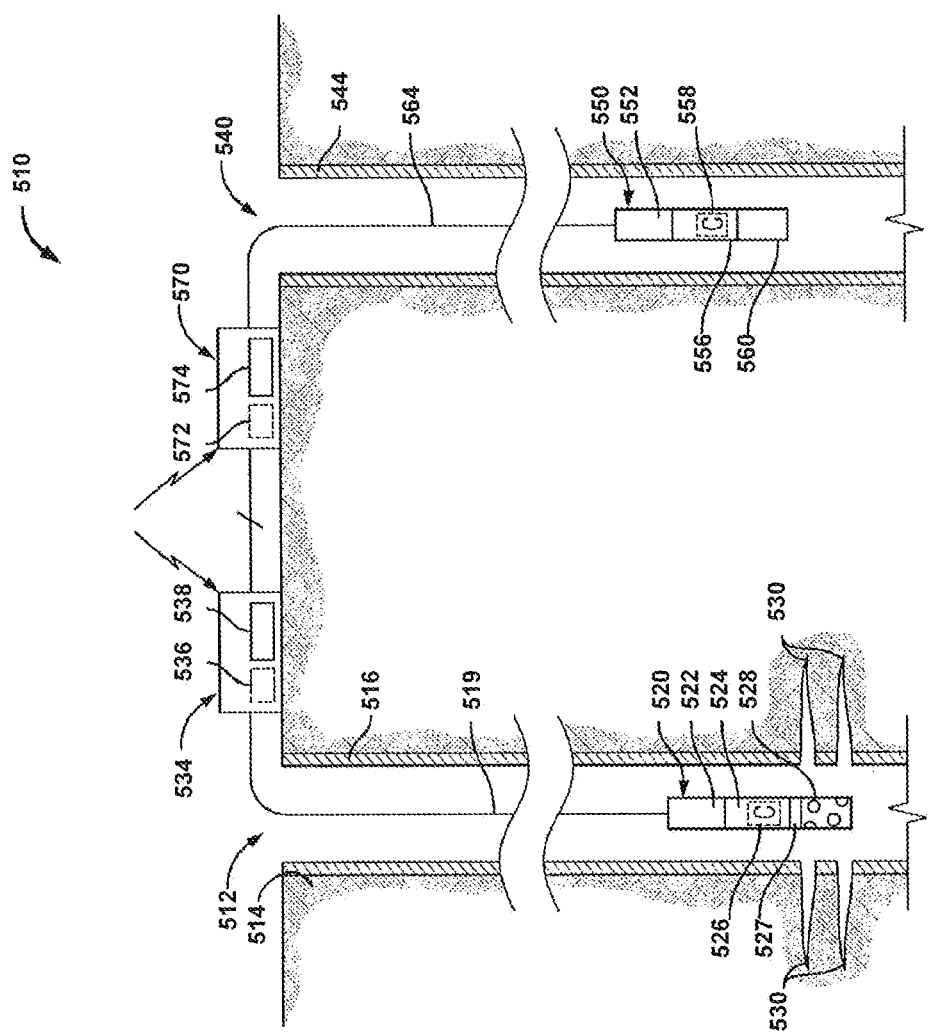
FIG. 5 illustrates a cross well seismic system in accordance with implementations of various technologies and techniques described herein.

In one implementation, a cross well seismic survey may be used to build and/or calibrate a seismic velocity model. The cross well seismic survey may be performed by creating a seismic event in one well, called a "source well," and measuring the event in another well, called a "monitoring well." For example, FIG. 5 illustrates a cross well seismic system 510 in accordance with implementations of various technologies and techniques described herein. In particular, the system 510 may include a source well 512 and a monitoring well 40. Seismic monitoring equipment may be run into the monitoring well 540 for purposes of monitoring an ongoing fracturing operation in the source well 512 (e.g., for purposes of microseismic hydraulic fracture monitoring). However, before such monitoring may occur, a seismic velocity model that characterizes the formation(s) between the wells 512 and 540 may first be developed.

As depicted in FIG. 5, in some implementations, the wells 512 and 540 may be cased and, thus, may be lined by respective casing strings 516 and 544, respectively. However, other implementations may be used with uncased wellbores. In another implementation, the system 510 may be applied to subsea wells.

In performing a cross well survey, a seismic source tool 520 may be run into the source well 512 to a known position. When activated, the seismic source tool 520 may produces a "shot," or seismic event, which may be measured by a seismic receiver tool 550 that is located in the monitoring well 540. In particular, the seismic energy that is recorded by the seismic receiver tool 550 may be the result of a seismic wave that is generated by the tool 520, after having traveled through and been reflected within the surrounding formation(s). The recorded seismic energy may be a function of the formation response, the sensor response, and the response of the recording instrument.

In one implementation, the tools 520 and 550 may be wireline tools that are run downhole on wirelines 519 and 564, respectively. In another implementation, a tubular string may be used in conjunction with tools 520 and 550.

In another implementation, the accuracy with which it triangulates the location of a detected microseismic event depends on the source and receiver geometry and the quality and signal-to-noise ratio (SNR) of the measurement. The multi-well monitoring technique used in the system 10 may offer improved location accuracy and better estimation of the source mechanism, as compared to a single well monitoring arrangement.

Attention is now directed to methods, techniques, and workflows for processing and/or transforming collected data that are in accordance with some implementations. Some operations in the processing procedures, methods, techniques, and workflows disclosed herein may be combined and/or the order of some operations may be changed. In the geosciences and/or other multi-dimensional data processing disciplines, various interpretations, sets of assumptions, and/or domain models such as velocity models, may be refined in an iterative fashion; this concept may be applicable to the procedures, methods, techniques, and workflows as discussed herein. This iterative refinement can include use of feedback loops executed on an algorithmic basis, such as via a computing system, as discussed later, and/or through manual control by a user who may make determinations regarding whether a given action, template, or model has become accurate.

Determining Rock Properties

As noted above, various forms of seismic surveys may be used to acquire seismic data related to a region of interest, such as three-dimensional (3D) surface seismic surveys, cross well seismic surveys, and/or the like.

In particular, 3D surface seismic data may be generated and recorded by the receivers, where the 3D surface seismic data may represent a set of sound vibrations propagating in three dimensions within the earth (i.e., along x, y, and z axes). However, in some scenarios, 3D surface seismic images may have less resolution than images derived from other seismic data, such as cross well seismic data.

Cross well seismic acquisition may produce a higher resolution image of the subsurface in comparison to other seismic methods, such as 3D surface seismic and/or vertical seismic profile (VSP) data. Accordingly, cross well seismic may be employed in geologic environments where high vertical resolution may be used to carry out a reservoir characterization. However, the two-dimensional (2D) image derived from the cross well seismic data may not span the entire region of interest, as the image may be localized to an area between its source well and monitoring well. In contrast, 3D surface seismic data may have spatial and vertical coverage which exceeds that of cross well seismic. For example, 3D surface seismic data may spatially and vertically cover substantially close to 100% of the region of interest.

Accordingly, in one implementation, cross well seismic data acquired in a cross well seismic survey of a region of interest, which may be 2D in nature, may be used to enhance 3D surface seismic data acquired in a seismic survey of the region of interest. This enhancement may be carried out in the inverted rock property domain. In particular, the result of such an enhancement may have the spatial and vertical coverage of the 3D surface seismic data with the resolution on the order of the cross well seismic data, thereby producing high resolution 3D rock properties corresponding to the region of interest.

Figure 6:
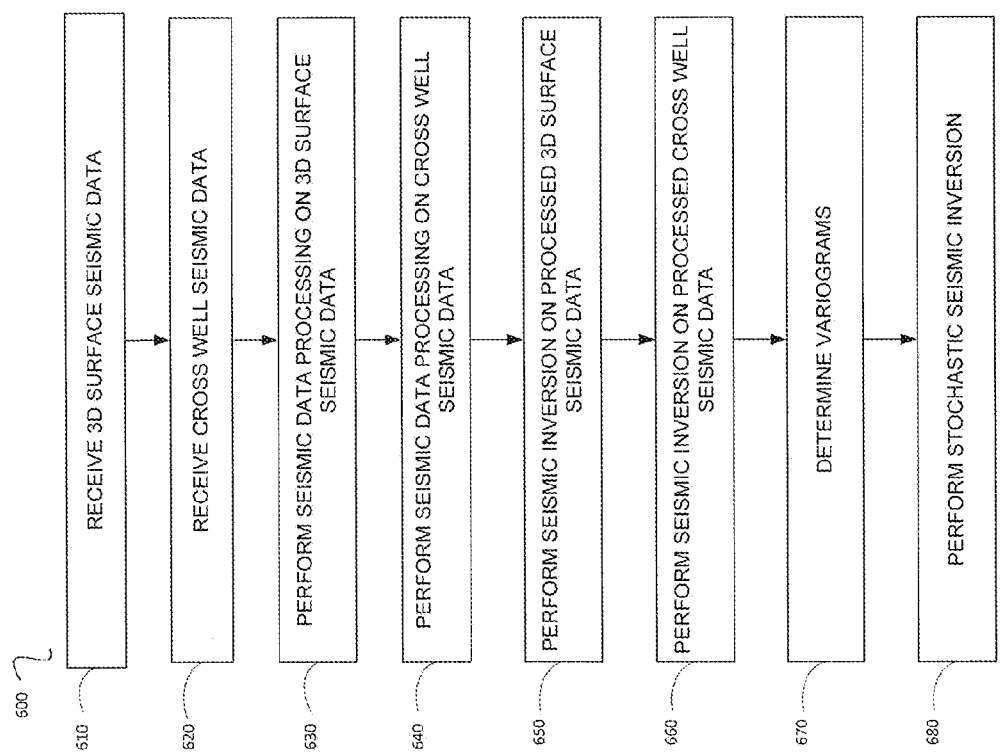
FIG. 6 illustrates a flow diagram of a method for determining one or more high resolution three-dimensional (3D) rock properties corresponding to the region of interest in accordance with implementations of various techniques described herein.

FIG. 6 illustrates a flow diagram of a method 600 for determining one or more high resolution 3D rock properties corresponding to the region of interest in accordance with implementations of various techniques described herein. In one implementation, method 600 may be performed by a computer application. It should be understood that while method 600 indicates a particular order of execution of operations, in some implementations, certain portions of the operations might be executed in a different order. Further, in some implementations, additional operations or blocks may be added to the method. Likewise, some operations or blocks may be omitted.

At block 610, 3D surface seismic data for a region of interest may be received. The region of interest may include one or more subterranean formations or other areas of a subsurface of the earth that may be of particular interest. For example, the region of interest may include one or more geological formations, reservoirs, and/or the like that may possibly contain hydrocarbons.

The 3D surface seismic data may be obtained and/or received using any implementation known to those skilled in the art, such as the one or more implementations discussed above with respect to FIGS. 1.1-4. The 3D surface seismic data may include one or more seismic traces recorded by one or more receivers (e.g., geophone-receiver 118 shown in FIG. 1.1). A seismic trace may refer to the seismic data recorded by a particular channel of a data acquisition system, where the channel can correspond to one receiver or a group of receivers. Further, the received 3D surface seismic data may contain responses from one or more "events," where the events correspond to reflections of acoustic energy at interfaces such as the horizon 114 shown in FIG. 1.1.

In one implementation, two or more sets of 3D surface seismic data may be received for the region of interest. In such an implementation, the two or more sets of 3D surface seismic data may include a set of compressional wave (or P-wave) data and/or a set of shear wave (or S-wave) data. Acoustic energy emitted by a seismic source (e.g., source 110 of FIG. 1.1) may predominantly be one or more P-waves. When the acoustic energy undergoes reflection at an interface, these waves may also undergo a partial mode conversion to one or more S-wave. Thus, the 3D surface seismic data acquired at a receiver may contain both P-waves and S-waves.

At block 620, cross well seismic data for the region of interest may be received. The cross well seismic data may be obtained and/or received using any implementation known to those skilled in the art, such as the one or more implementations discussed above with respect to FIG. 5. Similar to the 3D surface seismic data, the cross well seismic data acquired at a receiver may contain both P-waves and S-waves. In one implementation, the cross well seismic data may be obtained using a plurality of source wells and/or a plurality of monitoring wells. For example, the cross well seismic data may be obtained using a single monitoring well positioned between a plurality of source wells. Conversely, in another example, the cross well seismic data may be obtained using a single source well positioned between a plurality of monitoring wells. Other configurations using a plurality of source wells and/or a plurality of monitoring wells may also be used.

At block 630, one or more seismic data processing techniques may be performed on the 3D surface seismic data. Such seismic data processing techniques may include prestack data processing, such as migration and/or the like. In one implementation, a prestack depth migration (PSDM) may be performed on the received seismic data. The PSDM may be performed using any migration technique known to those skilled in the art, such as reverse time migration (RTM), Kirchhoff depth migration, Gaussian beam migration, wave-equation migration, and/or the like. An output of the migration may include one or more data records (i.e., seismic traces) gathered at a common surface location of image. A collection of traces, either input or output, with a common attribute, such as source location or migrated output location, may be referred to as a gather.

At block 640, one or more seismic data processing techniques may be performed on the cross well seismic data. Similar to above, such seismic data processing techniques may include prestack data processing, such as migration and/or the like, including, for example, PSDM.

At block 650, a seismic inversion may be performed on the processed 3D surface seismic data to obtain one or more 3D rock properties corresponding to the region of interest.

A seismic inversion may be a process by which seismic data is transformed into one or more rock properties describing a region of interest. Such a seismic inversion may include any number of processes known to those skilled in the art, such as deterministic inversion, stochastic inversion (as further discussed below), and/or discrete spike inversion. In particular, the seismic inversion may include acoustic inversion, amplitude versus offset (AVO) inversion, poststack multi-component inversion, multi-component AVO inversion, poststack time-lapse inversion, time lapse AVO inversion, AVO azimuthal inversion, trace integration, colored inversion, band-limited inversion, sparse spike inversion, model based inversion, neural networks, and/or the like.

The one or more rock properties that may be obtained via the seismic inversion process may include acoustic impedance, shear impedance, Poisson's ratio, fluid factor, bulk modulus, Young's modulus, P wave modulus, shear modulus, acoustic density, and/or the like.

At block 660, a seismic inversion may be performed on the processed cross well seismic data to obtain one or more rock properties corresponding to the region of interest. In one implementation, the seismic inversion may include one of the seismic inversions noted above with respect to block 650. Similarly, the one or more rock properties obtained may include one or more of the rock properties listed above with respect to block 650. In one implementation, the one or more rock properties obtained may include 2D rock properties. In such an implementation, the 2D rock properties may be processed, such as through interpolation, extrapolation, and/or the like, to simulate the rock properties in 3D.

At block 670, one or more variograms may be determined based on the rock properties obtained at block 660. In one implementation, a variogram may be a geostatistical tool used to depict spatial variance within groups of data, plotted as a function of distance between data points. When variograms are constructed from log data in wells, they can be used to map spatial and vertical variability. In one implementation, the variograms may be used to map spatial and vertical variability for the region of interest.

Further, one or more pseudo wells derived from the inverted cross well seismic data may be used to form the variograms via statistical analysis. A pseudo well may be a hypothetical well whose section is consistent with available formation geometry information in the analyzed area. Accordingly, in one implementation, one or more pseudo wells may be formed using the inverted cross well seismic data. In such an implementation, the pseudo wells may be created at predetermined distances (i.e., at selected traces) within the inverted cross well seismic data.

At block 680, a stochastic seismic inversion may be performed on the 3D rock properties derived in block 650 using the one or more variograms derived in block 670. In one implementation, a stochastic seismic inversion may be a method where the inversion is run for multiple iterations in order to produce multiple answers or to capture a full range of possible answers. In particular, stochastic seismic inversion may be used to cover different approaches for determining the probability density functions of model parameter variables. Further, the stochastic seismic inversion can be used for joint inversion of multiple geophysical data sets for better estimates of earth model parameters than inversion of individual data sets.

Accordingly, the stochastic seismic inversion may be used to enhance 3D rock properties, derived from processed 3D surface seismic data, using variograms derived from inverted cross well seismic data. An output of such an inversion may produce high resolution 3D rock properties, where the high resolution may correspond to the resolution of the cross well seismic data, while maintaining the spatial and vertical coverage of the 3D surface seismic data.

Figure 7:
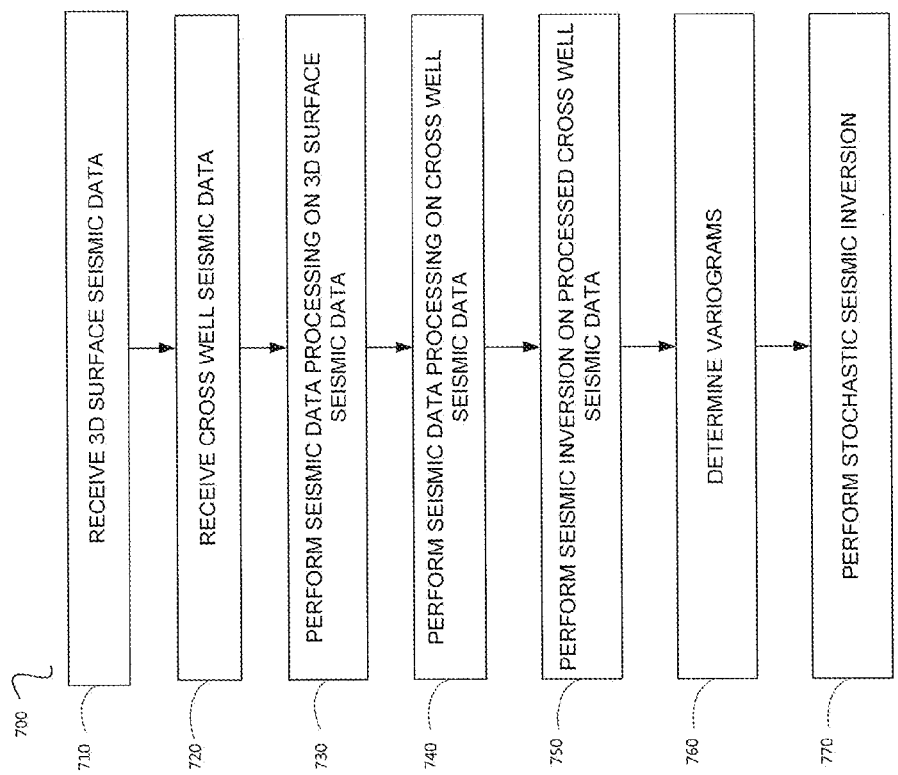
FIG. 7 illustrates a flow diagram of a method for determining one or more high resolution 3D rock properties corresponding to the region of interest in accordance with implementations of various techniques described herein.

In another implementation, FIG. 7 illustrates a flow diagram of a method 700 for determining one or more high resolution 3D rock properties corresponding to the region of interest in accordance with implementations of various techniques described herein. In one implementation, method 700 may be performed by a computer application. It should be understood that while method 700 indicates a particular order of execution of operations, in some implementations, certain portions of the operations might be executed in a different order. Further, in some implementations, additional operations or blocks may be added to the method. Likewise, some operations or blocks may be omitted.

Blocks 710-740 may correspond to blocks 610-640 as described above. With respect to block 750, a seismic inversion may be performed on the processed cross well seismic data to obtain one or more rock properties corresponding to the region of interest in a similar fashion as implemented in block 660.

At block 760, one or more variograms may be determined based on the rock properties obtained at block 750. Block 760 may be implemented similarly to block 670.

At block 770, a stochastic seismic inversion may be performed on the processed 3D surface seismic data derived in block 730 using the one or more variograms derived in block 760. In one implementation, the stochastic seismic inversion may be used to enhance the processed 3D surface seismic data using the variograms derived from the inverted cross well seismic data. An output of such an inversion may produce high resolution 3D rock properties, where the high resolution may correspond to the resolution of the cross well seismic data, while maintaining the spatial and vertical coverage of the 3D surface seismic data.

In some implementations, a method for determining one or more 3D rock properties may be provided. The method may receive 3D seismic data acquired in a seismic survey of a region of interest. The method may receive cross well seismic data acquired in a cross well seismic survey of the region of interest. The method may determine a first set of rock properties of the region of interest based on the cross well seismic data. The method may determine one or more variograms based on the first set of rock properties. The method may determine one or more 3D rock properties of the region of interest based on the one or more variograms and the 3D seismic data.

In some implementations, the method may perform one or more seismic processing techniques on the received 3D seismic data, and may perform the one or more seismic processing techniques on the received cross well seismic data. The one or more seismic processing techniques may include prestack data processing. The method may perform a first seismic inversion on the processed cross well seismic data to determine the first set of rock properties. The first seismic inversion may include deterministic inversions, stochastic inversions, or discrete spike inversions. The method may derive one or more pseudo wells based on the inverted cross well seismic data, and may derive the one or more variograms based on the one or more pseudo wells. The method may perform a second seismic inversion on the processed 3D surface seismic data to determine a second set of rock properties. The second seismic inversion may include deterministic inversions, stochastic inversions, or discrete spike inversions. The method may perform a stochastic inversion on the second set of rock properties using the one or more variograms. The resolution of the 3D rock properties may be greater than the resolution of the second set of rock properties. The method may perform a stochastic inversion on the processed 3D seismic data using the one or more variograms.

In some implementations, an information processing apparatus for use in a computing system is provided, and includes means for receiving 3D seismic data acquired in a seismic survey of a region of interest. The information processing apparatus may also have means for receiving cross well seismic data acquired in a cross well seismic survey of the region of interest. The information processing apparatus may also have means for determining a first set of rock properties of the region of interest based on the cross well seismic data. The information processing apparatus may also have means for determining one or more variograms based on the first set of rock properties. The information processing apparatus may also have means for determining one or more 3D rock properties of the region of interest based on the one or more variograms and the 3D seismic data.

In some implementations, a computing system is provided that includes at least one processor, at least one memory, and one or more programs stored in the at least one memory, wherein the programs include instructions, which when executed by the at least one processor cause the computing system to receive 3D seismic data acquired in a seismic survey of a region of interest. The programs may further include instructions to cause the computing system to receive cross well seismic data acquired in a cross well seismic survey of the region of interest. The programs may further include instructions to cause the computing system to determine a first set of rock properties of the region of interest based on the cross well seismic data. The programs may further include instructions to cause the computing system to determine one or more variograms based on the first set of rock properties. The programs may further include instructions to cause the computing system to determine one or more 3D rock properties of the region of interest based on the one or more variograms and the 3D seismic data.

In some implementations, a computer readable storage medium is provided, which has stored therein one or more programs, the one or more programs including instructions, which when executed by a processor, cause the processor to receive 3D seismic data acquired in a seismic survey of a region of interest. The programs may further include instructions, which cause the processor to receive cross well seismic data acquired in a cross well seismic survey of the region of interest. The programs may further include instructions, which cause the processor to determine a first set of rock properties of the region of interest based on the cross well seismic data. The programs may further include instructions, which cause the processor to determine one or more variograms based on the first set of rock properties. The programs may further include instructions, which cause the processor to determine one or more 3D rock properties of the region of interest based on the one or more variograms and the 3D seismic data.

Computing Systems

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smartphones, smartwatches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hard-wired links, wireless links, or combinations thereof. The distributed computing environments may span multiple continents and multiple vessels, ships or boats. In a distributed computing environment, program modules may be located in both local and remote computer storage media including memory storage devices.

Figure 8:
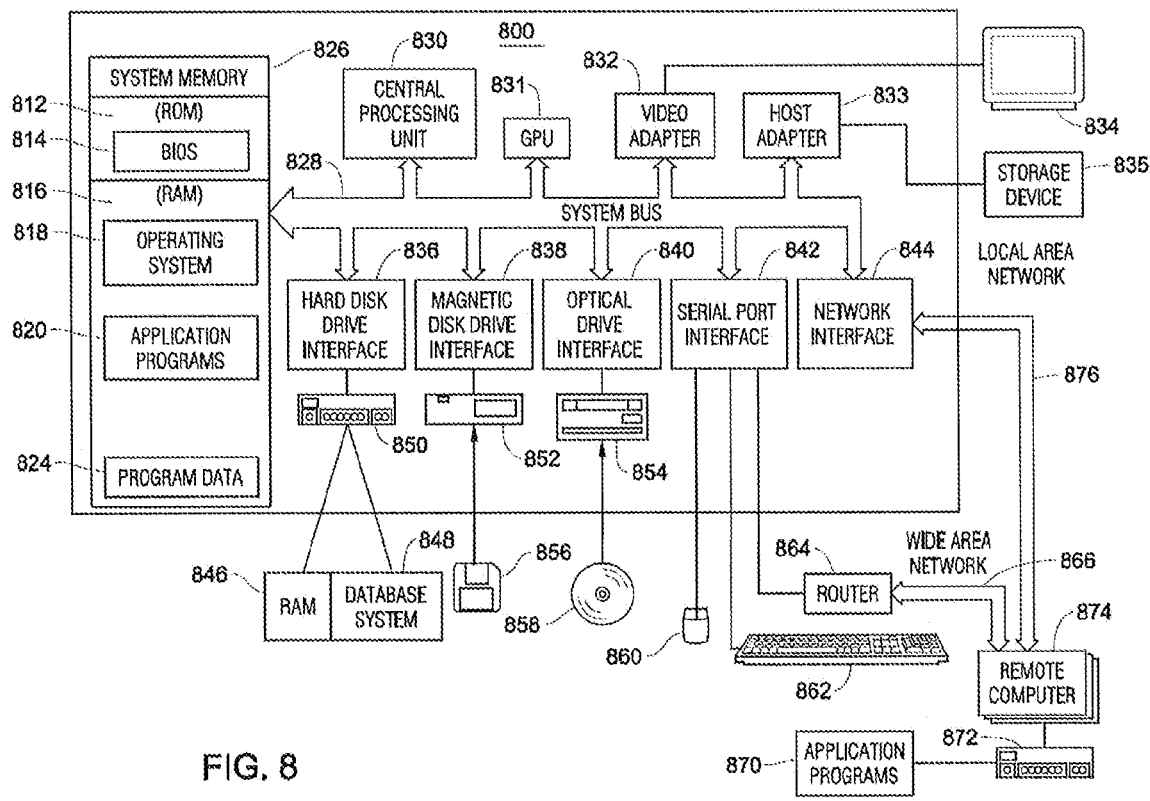
FIG. 8 illustrates a computing system in which various implementations of various techniques described herein may be implemented.

FIG. 8 illustrates a schematic diagram of a computing system 800 in which the various technologies described herein may be incorporated and practiced. Although the computing system 800 may be a conventional desktop or a server computer, as described above, other computer system configurations may be used.

The computing system 800 may include a central processing unit (CPU) 830, a system memory 826, a graphics processing unit (GPU) 831 and a system bus 828 that couples various system components including the system memory 826 to the CPU 830. Although one CPU is illustrated in FIG. 8, it should be understood that in some implementations the computing system 800 may include more than one CPU. The GPU 831 may be a microprocessor specifically designed to manipulate and implement computer graphics. The CPU 830 may offload work to the GPU 831. The GPU 831 may have its own graphics memory, and/or may have access to a portion of the system memory 826. As with the CPU 830, the GPU 831 may include one or more processing units, and the processing units may include one or more cores. The system bus 828 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 826 may include a read-only memory (ROM) 812 and a random access memory (RAM)

846. A basic input/output system (BIOS) 814, containing the basic routines that help transfer information between elements within the computing system 800, such as during start-up, may be stored in the ROM 812.

The computing system 800 may further include a hard disk drive 850 for reading from and writing to a hard disk, a magnetic disk drive 852 for reading from and writing to a removable magnetic disk 856, and an optical disk drive 854 for reading from and writing to a removable optical disk 858, such as a CD ROM or other optical media. The hard disk drive 850, the magnetic disk drive 852, and the optical disk drive 854 may be connected to the system bus 828 by a hard disk drive interface 856, a magnetic disk drive interface 858, and an optical drive interface 850, respectively. The drives and their associated computer-readable media may provide nonvolatile storage of computer-readable instructions, data structures, program modules and other data for the computing system 800.

Although the computing system 800 is described herein as having a hard disk, a removable magnetic disk 856 and a removable optical disk 858, it should be appreciated by those skilled in the art that the computing system 800 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 800. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 800 may also include a host adapter 833 that connects to a storage device 835 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 850, magnetic disk 856, optical disk 858, ROM 812 or RAM 816, including an operating system 818, one or more application programs 820, program data 824, and a database system 848. The application programs 820 may include various mobile applications ("apps") and other applications configured to perform various methods and techniques described herein. The operating system 818 may be any suitable operating system that may control the operation of a networked personal or server computer, such as Windows® XP, Mac OS® X, Unix-variants (e.g., Linux® and BSD®), and the like.

A user may enter commands and information into the computing system 800 through input devices such as a keyboard 862 and pointing device 860. Other input devices may include a microphone, joystick, game pad, satellite dish, scanner, or the like. These and other input devices may be connected to the CPU 830 through a serial port interface 842 coupled to system bus 828, but may be connected by other interfaces, such as a parallel port, game port or a universal serial bus (USB). A monitor 834 or other type of display device may also be connected to system bus 828 via an interface, such as a video adapter 832. In addition to the monitor 834, the computing system 800 may further include other peripheral output devices such as speakers and printers.

Further, the computing system 800 may operate in a networked environment using logical connections to one or more remote computers 874. The logical connections may be any connection that is commonplace in offices, enterprise-wide computer networks, intranets, and the Internet, such as local area network (LAN) 856 and a wide area network (WAN) 866. The remote computers 874 may be another a computer, a server computer, a router, a network PC, a peer device or other common network node, and may include many of the elements describes above relative to the computing system 800. The remote computers 874 may also each include application programs 870 similar to that of the computer action function.

When using a LAN networking environment, the computing system 800 may be connected to the local network 876 through a network interface or adapter 844. When used in a WAN networking environment, the computing system 800 may include a router 864, wireless router or other means for establishing communication over a wide area network 866, such as the Internet. The router 864, which may be internal or external, may be connected to the system bus 828 via the serial port interface 852. In a networked environment, program modules depicted relative to the computing system 800, or portions thereof, may be stored in a remote memory storage device 872. It will be appreciated that the network connections shown are merely examples and other means of establishing a communications link between the computers may be used.

The network interface 844 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 874.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, on the user's computing device, as a stand-alone software package, on the user's computer and on a remote computer or entirely on the remote computer or a server computer.

The system computer 800 may be located at a data center remote from the survey region. The system computer 800 may be in communication with the receivers (either directly or via a recording unit, not shown), to receive signals indicative of the reflected seismic energy. These signals, after conventional formatting and other initial processing, may be stored by the system computer 800 as digital data in the disk storage for subsequent retrieval and processing in the manner described above. In one implementation, these signals and data may be sent to the system computer 800 directly from sensors, such as geophones, hydrophones and the like. When receiving data directly from the sensors, the system computer 800 may be described as part of an in-field data processing system. In another implementation, the system computer 800 may process seismic data already stored in the disk storage. When processing data stored in the disk storage, the system computer 800 may be described as part of a remote data processing center, separate from data acquisition. The system computer 800 may be configured to process data as part of the in-field data processing system, the remote data processing system or a combination thereof.

Those with skill in the art will appreciate that any of the listed architectures, features or standards discussed above with respect to the example computing system 800 may be omitted for use with a computing system used in accordance with the various embodiments disclosed herein because technology and standards continue to evolve over time.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a three-dimensional space and/or subsurface region of interest may be collected and processed, e.g., medical imaging techniques such as tomography, ultrasound, MRI and the like for human tissue; radar, sonar, and LIDAR imaging techniques; and other appropriate three-dimensional imaging problems.

While the foregoing is directed to implementations of various technologies described herein, other and further implementations may be devised without departing from the basic scope thereof. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. A method, comprising:
   receiving three-dimensional (3D) seismic data acquired in a seismic survey of a region of interest;
   receiving cross well seismic data acquired in a cross well seismic survey of the region of interest;
   determining a first set of rock properties of the region of interest based on the cross well seismic data;
   determining one or more variograms based on the first set of rock properties; and
   determining one or more 3D rock properties of the region of interest based on the one or more variograms and the 3D seismic data.

2. The method of claim 1, further comprising:
   performing one or more seismic processing techniques on the received 3D seismic data; and
   performing the one or more seismic processing techniques on the received cross well seismic data.

3. The method of claim 2, wherein the one or more seismic processing techniques comprises prestack data processing.

4. The method of claim 2, wherein determining the first set of rock properties comprises:
   performing a first seismic inversion on the processed cross well seismic data to determine the first set of rock properties.

5. The method of claim 4, wherein the first seismic inversion comprises deterministic inversions, stochastic inversions, or discrete spike inversions.

6. The method of claim 4, wherein determining the one or more variograms comprises:
   deriving one or more pseudo wells based on the inverted cross well seismic data; and
   deriving the one or more variograms based on the one or more pseudo wells.

7. The method of claim 2, further comprising:
   performing a second seismic inversion on the processed 3D surface seismic data to determine a second set of rock properties.

8. The method of claim 7, wherein the second seismic inversion comprises deterministic inversions, stochastic inversions, or discrete spike inversions.

9. The method of claim 7, wherein determining the one or more 3D rock properties comprises:
   performing a stochastic inversion on the second set of rock properties using the one or more variograms.

10. The method of claim 7, wherein the resolution of the 3D rock properties is greater than the resolution of the second set of rock properties.

11. The method of claim 2, wherein determining the one or more 3D rock properties comprises:
    performing a stochastic inversion on the processed 3D seismic data using the one or more variograms.

12. A non-transitory computer-readable medium having stored thereon a plurality of computer-executable instructions which, when executed by a computer, cause the computer to:
    receive three-dimensional (3D) seismic data acquired in a seismic survey of a region of interest;
    receive cross well seismic data acquired in a cross well seismic survey of the region of interest;
    determine a first set of rock properties of the region of interest based on the cross well seismic data;
    determine one or more variograms based on the first set of rock properties; and determine one or more 3D rock properties of the region of interest based on the one or more variograms and the 3D seismic data.

13. The non-transitory computer-readable medium of claim 12, wherein the computer-executable instructions which, when executed by a computer, further cause the computer to:
perform one or more seismic processing techniques on the received 3D seismic data; and
perform the one or more seismic processing techniques on the received cross well seismic data.

14. The non-transitory computer-readable medium of claim 13, wherein the computer-executable instructions which, when executed by a computer, cause the computer to determine the first set of rock properties, further comprise computer-executable instructions which, when executed by a computer, cause the computer to:
perform a first seismic inversion on the processed cross well seismic data to determine the first set of rock properties.

15. The non-transitory computer-readable medium of claim 14, wherein determining the one or more variograms comprises:
derive one or more pseudo wells based on the inverted cross well seismic data; and
derive the one or more variograms based on the one or more pseudo wells.

16. The non-transitory computer-readable medium of claim 12, wherein the computer-executable instructions which, when executed by a computer, cause the computer to determine the one or more 3D rock properties, further comprise computer-executable instructions which, when executed by a computer, cause the computer to:
perform a stochastic inversion on the processed 3D seismic data using the one or more variograms.

17. A computer system, comprising:
a processor; and
a memory comprising a plurality of program instructions which, when executed by the processor, cause the processor to:
receive three-dimensional (3D) seismic data acquired in a seismic survey of a region of interest;
receive cross well seismic data acquired in a cross well seismic survey of the region of interest;
determine a first set of rock properties of the region of interest based on the cross well seismic data;
determine one or more variograms based on the first set of rock properties; and
determine one or more 3D rock properties of the region of interest based on the one or more variograms and the 3D seismic data.

18. The computer system of claim 17, further comprising program instructions which, when executed by the processor, cause the processor to:
perform one or more seismic processing techniques on the received 3D seismic data; and
perform the one or more seismic processing techniques on the received cross well seismic data.

19. The computer system of claim 18, further comprising program instructions which, when executed by the processor, cause the processor to:
perform a seismic inversion on the processed cross well seismic data to determine a second set of rock properties.

20. The computer system of claim 19, wherein determining the one or more high resolution 3D rock properties comprises:
perform a stochastic inversion based on the second set of rock properties using the one or more variograms.

* * * * *